United States Patent
Arumugam

(10) Patent No.: US 10,445,711 B1
(45) Date of Patent: Oct. 15, 2019

(54) REMOTE CONTROLLED ATM SYSTEM AND METHOD

(71) Applicant: JPMorgan Chase Bank, N.A., New York, NY (US)

(72) Inventor: Avin Arumugam, San Francisco, CA (US)

(73) Assignee: JP MORGAN CHASE BANK, N.A., New York, NY (US)

( * ) Notice: Subject to any disclaimer, the term of this patent is extended or adjusted under 35 U.S.C. 154(b) by 412 days.

(21) Appl. No.: 14/603,705

(22) Filed: Jan. 23, 2015

Related U.S. Application Data

(60) Provisional application No. 61/931,179, filed on Jan. 24, 2014.

(51) Int. Cl.
| | |
|---|---|
| *G06Q 40/00* | (2012.01) |
| *G06Q 20/10* | (2012.01) |
| *G07F 19/00* | (2006.01) |
| *G06Q 20/38* | (2012.01) |

(52) U.S. Cl.
CPC ....... *G06Q 20/1085* (2013.01); *G06Q 20/385* (2013.01); *G07F 19/201* (2013.01); *G06Q 20/382* (2013.01); *G07F 19/20* (2013.01)

(58) Field of Classification Search
CPC .............. G06Q 40/00; G06F 7/24; H04L 9/32
USPC .............. 705/41, 43; 235/381; 713/155
See application file for complete search history.

(56) References Cited

U.S. PATENT DOCUMENTS

| | | | | |
|---|---|---|---|---|
| 7,350,230 B2 * | 3/2008 | Forrest | ............... | G06Q 20/32 705/67 |
| 7,490,758 B2 * | 2/2009 | Drummond | .......... | G06Q 20/327 235/379 |
| 7,591,413 B1 * | 9/2009 | Block | ................. | G07F 19/20 235/379 |

(Continued)

FOREIGN PATENT DOCUMENTS

KR          20090086178 A  *  8/2009    ............. G06Q 40/02

OTHER PUBLICATIONS

By, S. S. (2011). NCR virtual tellers on the job round the clock. ATM & Debit News, 13(20), 3. Retrieved from https://dialog.proquest.com/professional/docview/867816885?accountid=142257 on Jul. 2, 2019 (Year: 2011).*

(Continued)

*Primary Examiner* — Kito R Robinson
(74) *Attorney, Agent, or Firm* — Greenblum & Bernstein, P.L.C.

(57) ABSTRACT

Embodiments of the invention are related generally to systems and methods for enabling remote control functionality of an Automated Teller Machine ("ATM") from a mobile device. In the present invention, a customer may use a mobile device to connect to an ATM and remotely control the ATM while completing various transactions. In embodiments of the invention, the user may scan a Quck Response ("QR") Code with the mobile device which will initiate the remote connection to the ATM. The ATM display screen may remain frozen or blank, or in embodiments of the invention, may display generic content and/or content directed towards the user. Thus, the user may securely complete the desired transaction(s). In embodiments of the (Continued)

invention, the user may also use the mobile device to generate a one-time authentication code for use by a second user at an ATM.

20 Claims, 6 Drawing Sheets

(56) References Cited

U.S. PATENT DOCUMENTS

| | | | | |
|---|---|---|---|---|
| 7,654,450 B2* | 2/2010 | Mateen | G06Q 20/04 | 235/379 |
| 8,843,830 B2* | 9/2014 | Eom | H04N 21/42224 | 345/1.2 |
| 8,875,282 B2* | 10/2014 | Sinclair | G06F 21/34 | 713/179 |
| 2001/0029528 A1* | 10/2001 | Coutts | G06Q 20/1085 | 709/219 |
| 2002/0099658 A1* | 7/2002 | Nielsen | G06Q 20/1085 | 705/43 |
| 2003/0050075 A1* | 3/2003 | Rangarajan | G01C 21/20 | 455/456.1 |
| 2004/0124966 A1* | 7/2004 | Forrest | G06Q 20/32 | 340/5.8 |
| 2006/0068817 A1* | 3/2006 | Black | G06Q 20/327 | 455/466 |
| 2011/0055084 A1* | 3/2011 | Singh | G06Q 20/1085 | 705/43 |
| 2011/0238573 A1* | 9/2011 | Varadarajan | G06Q 20/1085 | 705/43 |
| 2012/0061458 A1* | 3/2012 | Bahr | G06K 7/10792 | 235/375 |
| 2012/0160912 A1* | 6/2012 | Laracey | G06Q 20/1085 | 235/379 |
| 2012/0197797 A1* | 8/2012 | Grigg | G06Q 20/1085 | 705/43 |
| 2012/0259778 A1* | 10/2012 | Banerjee | G06Q 20/10 | 705/43 |
| 2013/0084797 A1* | 4/2013 | Avadhanam | G06F 9/44505 | 455/41.1 |
| 2013/0124411 A1* | 5/2013 | Kobres | G06Q 40/02 | 705/43 |
| 2013/0178233 A1* | 7/2013 | McCoy | H04W 4/021 | 455/456.3 |
| 2013/0185148 A1* | 7/2013 | Townsend | G06Q 30/0251 | 705/14.49 |
| 2013/0238497 A1* | 9/2013 | Ramachandran | G06Q 20/36 | 705/41 |
| 2014/0006451 A1* | 1/2014 | Mullis | G06Q 20/18 | 707/784 |
| 2014/0055552 A1* | 2/2014 | Song | H04N 7/141 | 348/14.02 |
| 2014/0152425 A1* | 6/2014 | Valentine | G06F 3/00 | 340/10.51 |
| 2015/0019424 A1* | 1/2015 | Pourfallah | G06Q 40/02 | 705/43 |
| 2015/0120878 A1* | 4/2015 | Horgan | G06F 1/165 | 709/219 |
| 2016/0246957 A1* | 8/2016 | Shen | G06F 21/85 | |

OTHER PUBLICATIONS

Park, J., Choi, S., & Kim, D. (2013). SmartKeyboard for the disabled in smartwork Springer Verlag, Tiergartenstrasse 17, D-69121. doi:http://dx.doi.org/10.1007/978-94-007-5860-5_55 Retrieved from https://dialog.proquest.com/professional/docview/1314280282?accountid=142257 on Jul. 2, 2019 (Year: 2013).*

LowellBank to expand its branch network using NCR APTRA interactive teller. (Oct. 17, 2012). Business Wire Retrieved from https://dialog.proquest.com/professional/docview/1112687807?accountid=142257 (Year: 2012).*

* cited by examiner

REMOTE CONTROLLED ATM SYSTEM AND METHOD

CROSS-REFERENCE TO RELATED APPLICATIONS

This application claims priority to U.S. Provisional Application Ser. No. 61/931,179, filed Jan. 24, 2014. This application further relates to co-pending U.S. patent application Ser. No. 13/495,145, entitled "ATM Privacy System and Method," filed Jun. 13, 2012, which is incorporated herein by reference.

TECHNICAL FIELD

Embodiments of the invention are related generally to systems and methods for enabling remote control functionality of an Automated Teller Machine ("ATM") from a mobile device.

BACKGROUND OF THE INVENTION

Financial institution customers often find it desirable or convenient to use ATMs for conducting financial transactions and/or taking advantage of other services offered by the financial institution. However, there are numerous privacy concerns associated with conducting transactions at an ATM. For example, often ATMs are located in crowded or high traffic areas, and are designed so that there is little or no physical barrier surrounding the machine. In such cases, when entering information into an ATM, often through the keypad or on a touchscreen, customers risk having their personal information, such as their Personal Identification Number ("PIN"), account numbers, account balance or other information compromised by this lack of privacy.

In addition, currently, ATMs typically require a financial card, such as a credit or debit card, to initiate a transaction. However, customers may, in certain situations, find themselves without their financial card. A customer who has, for example, forgotten his or her wallet at home may need to make a cash withdrawal, but would not be able to without a card associated with the customer's financial institution. Indeed, customers may encounter a variety of scenarios in which they need to make a transaction at an ATM but do not have access to their financial institution card. For example, the card may have been stolen, the customer may be traveling and not have immediate access to the card, or the card may be in the customer's possession but has become unusable or non-functional. In other instances, the customer may be waiting on a replacement card after having encountered one of these situations (or any other).

Perhaps due to the increased customer demands for privacy and efficiency, in recent years, there has been a dramatic rise in the use of mobile banking by customers. In fact, in many cases, customers often prefer to access certain financial institution services (such as, for instance, making deposits and withdrawals, or accessing an account balance) through a mobile device, such as a smartphone or personal digital assistant. In addition, whereas an ATM transaction typically requires waiting in line and providing a customer's financial card, conducting the same transaction on a mobile device only requires the device itself. The convenience of being able to perform transactions from the customer's mobile device has led customers to expect faster, more efficient transactions from their financial institutions. However, for many reasons, financial institutions may often wish to encourage the use of ATM transactions. For instance, these transactions might encourage users to enter the bank (where the ATM location is inside the bank), where the customer can then be approached by customer service representatives and offered a wider range of services than what may be available online.

Accordingly, a solution is needed that will further enhance customer security and efficiency at ATMs. The solution should be designed to serve customers who are without immediate access to their financial institution card, and also to also take advantage of the current customer demand to use a mobile device as part of these transactions.

BRIEF SUMMARY OF THE INVENTION

In accordance with exemplary embodiments of the present invention, there is provided a system for remotely accessing an automated teller machine ("ATM") associated with a financial institution, the system comprising: an ATM, comprising an ATM keypad and an ATM screen; a transaction processing system, the transaction processing system being configured to: identify a mobile device over a network, the mobile device comprising an associated user input means and display; connect the mobile device to the ATM over the network; and display a remote keypad on the display associated with the mobile device; wherein the remote keypad is operable to control the ATM keypad.

In a further aspect of the invention, there is provided a method for remotely accessing an automated teller machine ("ATM") associated with a financial institution, the method comprising: identifying a mobile device over a network, the mobile device comprising an associated user input means and display; connecting the mobile device to the ATM over the network; displaying a remote keypad on the display associated with the mobile device; and controlling the ATM keypad using the remote keypad.

In a further aspect of the invention, there is provided a system for generating a one-time authentication code and remotely accessing an automated teller machine ("ATM") associated with a financial institution, the system comprising: an ATM, comprising an ATM keypad and an ATM screen; a first mobile device operable to generate the one-time authentication code and transmit the one-time authentication code over a network to a second mobile device; a transaction processing system, the transaction processing system being configured to: identify the second mobile device over the network, the second mobile device comprising an associated user input means and display; connect the second mobile device to the ATM over the network; request entry of the one-time authentication code; and display a remote keypad on the display associated with the mobile device; wherein the remote keypad is operable to control the ATM keypad.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the invention are related generally to systems and methods for enabling remote control functionality of an Automated Teller Machine ("ATM") from a mobile device. In embodiments of the invention, this will further include the disabling of the ATM keypad so that the mobile phone is in complete or partial control of the keypad.

Figure 1:
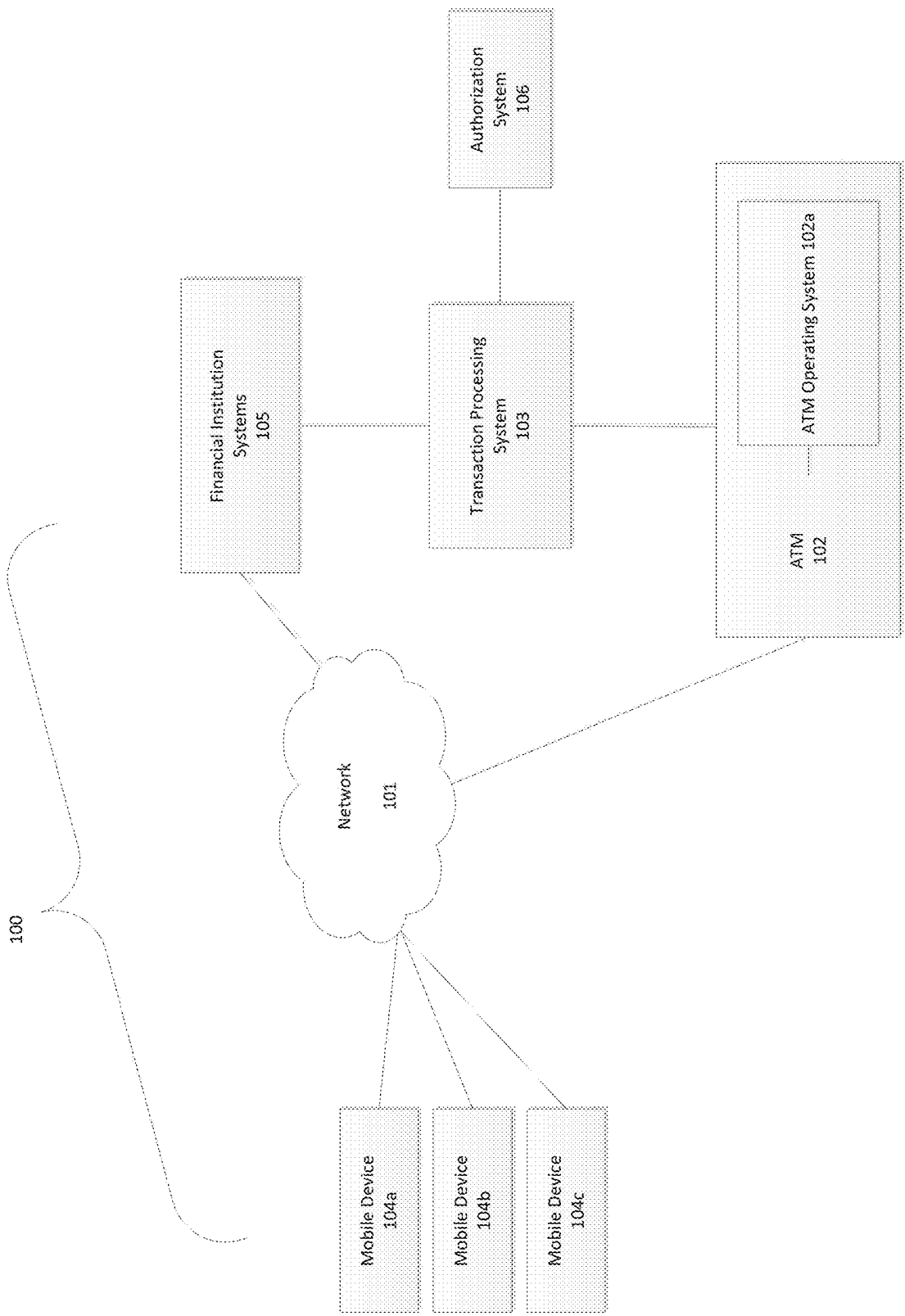
FIG. 1 is a block diagram illustrating an operating environment for a system in accordance with an embodiment of the invention.

FIG. 1 is a block diagram illustrating an operating environment for a remote controlled ATM system 100 in accordance with an embodiment of the invention. The network 101 is preferably the Internet, but may be or include other types of networks. For instance, network 101 may be or include a host platform at a financial services firm or financial institution. In addition, the network 101 may further include many financial management systems that are not shown. Further, in embodiments of the invention, multiple networks may be used. The network 101 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The Financial Institution Systems 105 may include any system of platform hosted by a financial institution. In an embodiment of the invention, ATM 102 and Financial Institution Systems 105 are both connected to network 101, and Financial Institution Systems 105 may further be in communication with ATM 102 (particularly where the ATM 102 is affiliated with the financial institution hosting Financial Institution Systems 105). This communication may occur through transaction processing system 103, which is capable of communicating account information from the financial institution systems 105 to the ATM 102, and in turn, communicating transaction information relating to ATM 102 transactions back to Financial Institution Systems 105. In embodiments of the invention, transaction processing system 103 may also include authorization system 106, which is operable to ensure that the transactions made at ATM 102 are secure and authorized (e.g., that a user has entered the correct PIN, that a requested withdrawal amount is not greater than an account balance, etc.).

ATM 102 allows customers to access their bank accounts in order to, for instance, make deposits, withdrawals, and transfers and/or check account balance. ATM 102 may have many other capabilities and uses which are well known in the art. ATM 102 may include at least one processor and multiple applications executed on the processor capable of executing selected transactions, and may further be programmed with operating system 102a. Alternatively or additionally, the ATM operating system 102a may be capable of accessing other connected systems that offer such functionality over network 101, the Internet, or any other network.

In an embodiment of the invention, the customers associated with exemplary mobile devices 104a, 104b and 104c may have accounts associated with the financial institution. (For simplicity, mobile device 104a will be discussed going forward, however, those skilled in the art will appreciate that the system may include multiple mobile devices, including 104b, 104c, and others, connected over the network simultaneously and/or at different times). The mobile device 104a may be a portable computing device or mobile device, such as a smartphone or tablet device, with user input means and display. The mobile device 104a may be or include any handheld mobile devices with internet access such as iPhones or other mobile phones (e.g., Android devices, Samsung devices, and/or Blackberries), tablets (such as an iPad, iPad Mini, Amazon Kindle Fire, etc.), laptop computer, wearable devices, or any other known devices.

Remote controlled ATM system 100 is capable of making transactions more secure and more efficient by allowing a customer to control the ATM 102 with mobile device 104a. The mobile device 104a and ATM 102 may be connected in various different ways in accordance with embodiments of the invention. For instance, ATM 102 may output a signal detectable by mobile device 104a, and may, for example, simply instruct a prompt or push notification to appear on the screen of mobile device 104a (e.g., "You are currently near ATM Location #123. Do you wish to connect to ATM #3 now?") when the device is within a predetermined range of the signal. The customer may then change the settings of mobile device 104a if these prompts are not desirable, or only desirable for certain locations, times, days, etc. Additionally or alternatively, mobile device 104a may execute downloadable applications for operating in conjunction with remote controlled ATM system 100. The downloadable applications may be stored in memory and executed by processors on the mobile device 104a and may provide a plurality of user interfaces. ATM 102, upon detecting that mobile device 104a is within a specified physical range, may then instruct the user to customer to, for instance, launch a specific application on mobile device 104a. ATM 102 may also be capable of detecting when a particular mobile application is being opened by mobile device 104a, and the mobile application may then allow the customer associated with mobile device 104a to remotely connect to and control ATM 102.

In embodiments of the invention, authorization system 106 may be operable to generate a token or authentication code for display at ATM 102. A customer associated with the mobile device 104a could then input the authentication code into, for example, mobile device 104a, and the connection would be established over network 101. The downloadable applications may include, for example, applications that when executed, connect automatically to the nearest ATM 102, or request input for the authentication code generated at the ATM 102 by authorization system 106. In addition, mobile device 104a may include cameras and/or other image capture applications for capturing a scannable barcode (for instance, a QR Code) or any other type of code (e.g., an alphanumeric code to be input into an application) which automatically directs the mobile device's browser to a URL offering a web-based platform for remotely controlling the keypad associated with ATM 102.

Those skilled in the art will appreciate that the described embodiments are intended to be exemplary, and that there may be other methods for authenticating the connection between mobile device 104 to the ATM 102. In embodiments of the invention, the customer might, for example, select a "mobile" button on ATM display 101 which prompts authorization system 106 to generate the authentication token. The customer can then launch an application on the mobile device 108 and input the token in order to remotely control ATM 102.

Once a connection has been established and authenticated between mobile device 104a and ATM 102 over network 101, the keypad associated with ATM 102 can then be controlled, either completely or in part, from the mobile device. The level of control afforded to mobile device 104a may vary on the preferences of the financial institution associated with ATM 102. In some instances, it may be desirable to allow the customer to completely control the keypad associated with ATM 102 from mobile device 104a. In other instances, however, it may be preferable to limit the control from mobile device 104a for a few specific types of transactions (e.g., withdrawals only) or on any other basis as well. For example, in embodiments of the invention, the mobile device 104a may have more complete control of the keypad associated with ATM 102 depending on the type or level of account maintained by the customer associated with the mobile device 104a. In embodiments of the invention, the level of control may also be determined by, for instance, the time of day (a need for increased security measures of night may allow for a customer to have a greater level of control after 7 p.m.) or capabilities of ATM 102.

Figure 2:
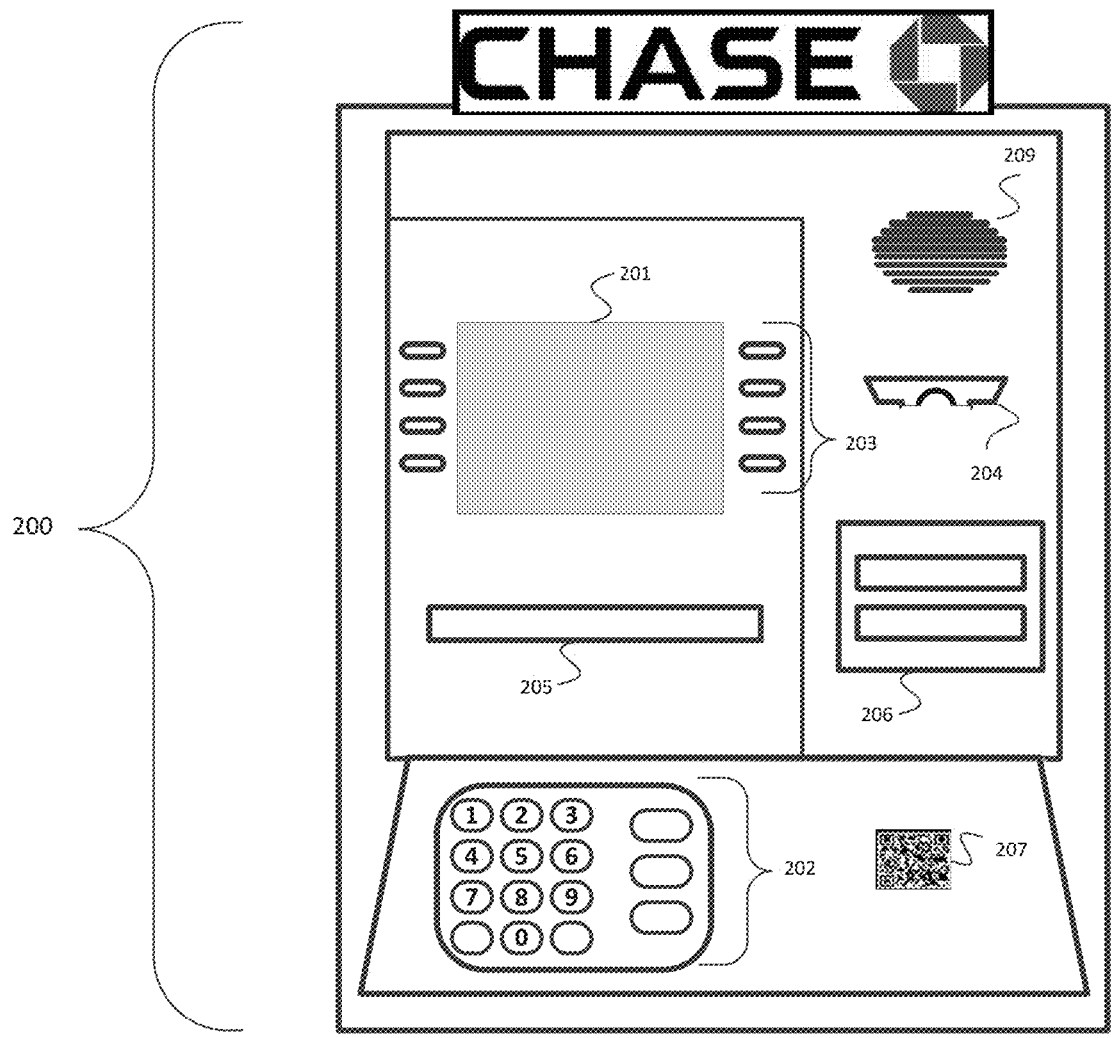
FIG. 2 is a diagram illustrating an exemplary ATM interface in accordance with an embodiment of the invention.

FIG. 2 shows a basic diagram of an exemplary ATM interface 200 in accordance with an embodiment of the invention. The ATM interface unit 200 includes display 201, keypad 202 (also called a PIN Pad, or an ATM Encrypting PIN Pad), and screen buttons 203 for inputting and viewing information about a customer's account. In embodiments of the invention, display 201 may also be a touch screen. When the customer inserts a card associated with the customer's account, card reader 204 identifies the customer (or a financial account associated with the customer). Other embodiments of the invention may identify the customer based on the type of card inserted into the card reader and/or based on a manually entered account number, contact list card, mobile phone data, RFID device, biometric data, or any other identification device and/or data. Dispenser 205 dispenses cash to the customer, while deposit slot 206 allows the customer to insert a deposit. In embodiments of the invention, deposit slot 206 may accept deposit envelopes and/or cash and checks without deposit envelopes. As the customer proceeds throughout the transaction, sounds and prompts originate from the speaker 209.

In embodiments of the invention, the ATM interface 200 will further comprise a barcode 207 scannable by a mobile device. The barcode may be, for instance, a typical Universal Product Code ("UPC") barcode Quick Response ("QR") Code, or any other type of barcode scannable by a mobile device. In an exemplary embodiment of the invention, the customer, upon arriving at the ATM interface 200, may scan barcode 207 using mobile phone. In embodiments of the invention, the barcode 207 may direct the mobile device's browser to a URL which offers a web-based platform for remotely controlling the ATM keypad 202. Those skilled in the art will appreciate that there may be other methods for connecting mobile device to the ATM user interface 200.

In embodiments of the invention, the user's access of the ATM from a mobile device will disable all or part of the functionality of display 201 while the customer is remotely controlling the ATM keypad 202 and completing a transaction on the mobile device. Such an embodiment may be desirable where the customer wishes to avoid entering information or data on the highly visible keypad 202 and/or screen buttons 203. While the customer controls the ATM keypad 202, in embodiments of the invention, the display 201 may remain on the initial welcome screen, or it may go blank. In embodiments of the invention, the screen may generate advertisements and/or messages using content generation components. In a further embodiment, the advertisements and/or messages may be based on the customer account's affiliation with a co-branded or affinity card. For example, a customer who accesses the ATM interface via a mobile device may have a co-branded card affiliated with a particular airline. In such a case, display 201 might generate a static advertisement for the airline and/or show a short video or commercial about the airline with information about offers associated with the airline. The advertisement might even generate content based on the location of the ATM; for instance, in the case of the customer with the a co-branded airline card, display 102 associated with ATM 102 located in Washington, D.C. may picture a flight schedule for that airline at Reagan National Airport. In one example, a customer with a partnered department store card might be alerted about an upcoming sale (either company-wide, or at a nearby location) at that department store. Using speakers 209, the ATM interface 200 may also play audio to accompany the images and/or videos being shown on the display. In yet another exemplary embodiment, a user presenting a co-branded Washington Redskins affinity card may be shown a highlight clip of a recent game, or may be presented with information regarding an upcoming event for season ticketholders.

In an exemplary embodiment, display 201 might show images that are intended to entertain children accompanying the customer performing the ATM transaction. This might include, for example, children's pictures, videos, sounds, songs and the like. In embodiments of the invention where a mobile downloadable application is implemented in the system, the customer may wish to include the birthdate(s) of any child(ren) so that any content geared thereto will be age-appropriate. For example, content geared toward a five-year old child may be a clip from a popular children's television show, such as SpongeBob SquarePants. Content may also be geared towards babies (playing Baby Einstein videos) or teenagers (popular YouTube videos). For customers who are completing an ATM transaction with children, this feature has the added benefit of freeing the customer to quickly execute and complete the transaction.

Additionally or alternatively, the display 201 may be capable of presenting a game or other interactive content to the child. In embodiments of the invention, the targeted content may also include games or other interactive content such as, for instance, trivia questions and video-type games. For instance, display 201 may show a round of three to five trivia questions to a middle-school aged child, which the child can answer using keypad 202. In embodiments of the invention, the keypad may also function as a controller for any other type of game. Accordingly, for instance, a simple color matching game may be shown to an elementary-school aged child, and the child may use the keypad 202 to indicate and select the matching elements.

Figure 3A:
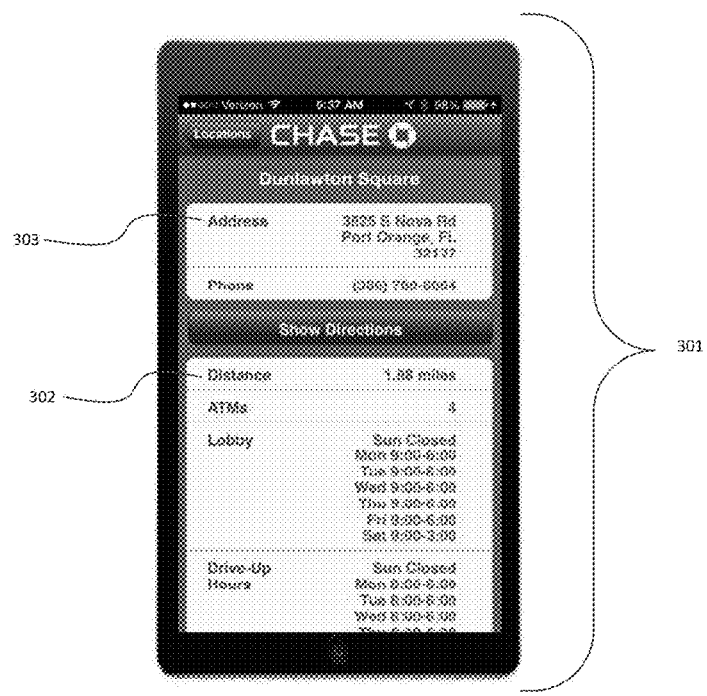
FIG. 3a is a diagram illustrating an example of a general mobile application on a mobile device configured to connect to and remotely control an ATM, in accordance with an embodiment of the invention.
Figure 3B:
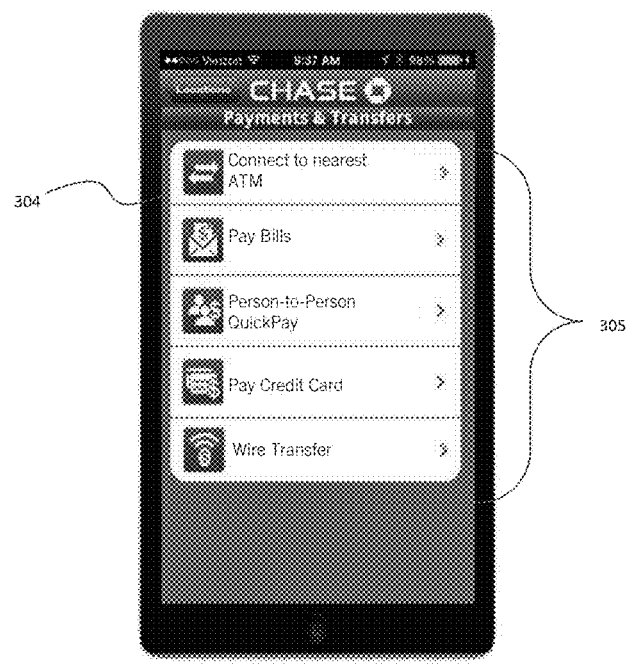
FIG. 3b is a diagram illustrating an example of an exemplary user interface menu on a mobile device configured to connect to and remotely control an ATM, in accordance with an embodiment of the invention.

In embodiments of the invention, the customer may be able to access other functionality from the same mobile application, as in e.g., FIG. 3a, a diagram illustrating an example of a mobile device configured to connect to and remotely control an ATM, in accordance with embodiments of the invention As noted above, mobile device 301 has accessed an application associated with a financial institution, and has located the customer's distance 302 from address 303 of a nearby ATM. As shown in FIG. 3b, in embodiments of the invention, the customer may be able to access a menu screen with selectable options 305. The menu screen with selectable options 305 may include, for instance, a selectable option to "connect to the nearest ATM" 304. In embodiments of the invention, the customer's distance from the ATM must be within a predetermined amount (e.g., "within 10 feet" or "0.00 miles") before the selectable option to "connect to the nearest ATM" 304 is displayed at all on the menu screen with selectable options 305. The customer who wishes to remotely control an ATM may then be able to select the option to "connect to the nearest ATM" 304 in order to do so. Those skilled in the art will appreciate that this described embodiment is intended to be exemplary, and that in embodiments of the invention, the mobile application accessed by the phone may not be sponsored by or otherwise associated with the financial institution.

Figure 4:
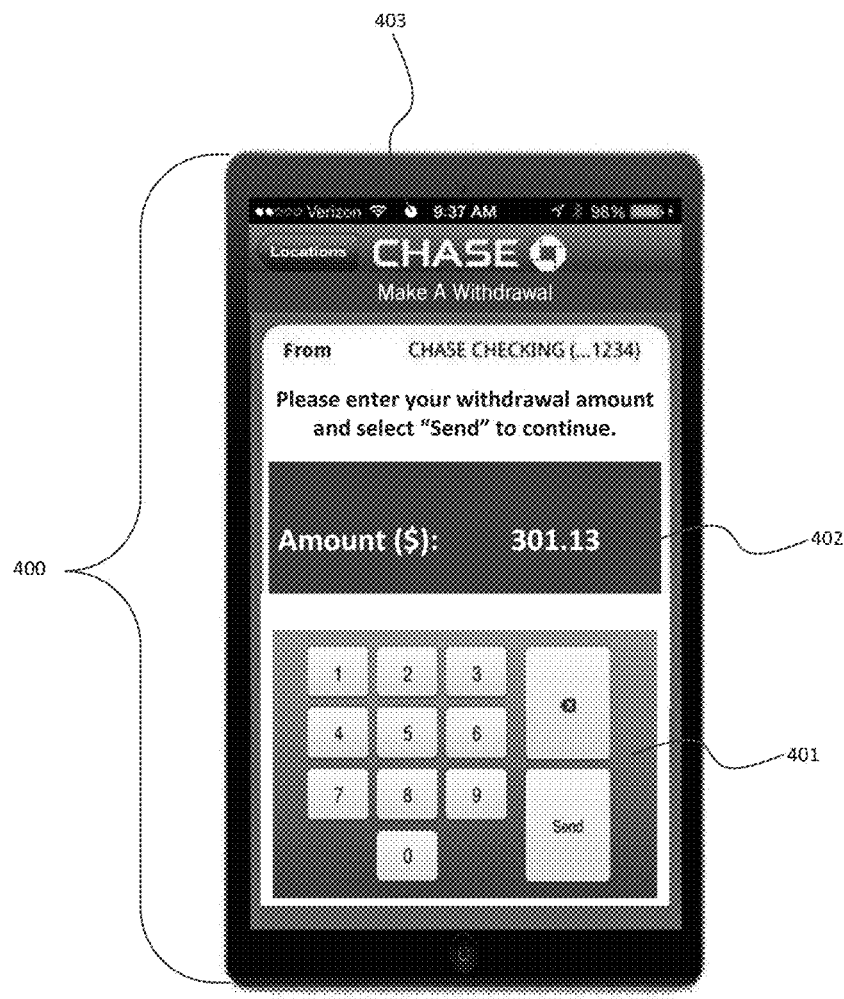
FIG. 4 is a diagram illustrating an exemplary mobile device user interface while the device is remotely connected to an ATM, in accordance with an embodiment of the invention.

In embodiments of the invention, the customer, upon successfully connecting the mobile device with an ATM, may be presented with an interface which presents the user with options, such as, for instance, options to make a deposit or transfer, or to make a withdrawal. As shown in FIG. 4, a customer who chooses to make a withdrawal may select that option on mobile device 400 and would then be presented with, for instance, a screen which allows the user to select the amount of the withdrawal. For instance, in an exemplary embodiment, the user may use remote ATM keypad 401 to enter an amount for withdrawal 402. Icon 403, or any other type of notification, may be displayed to indicate that the mobile device 400 is remotely connected to the ATM. The notification could also be, for instance, a push notification or text message or any other type of notification compatible with the mobile device.

In embodiments of the invention, a customer who only wishes to use remote control feature to check the balance on an account might not need the numeric keypad 401 to display on the mobile device 400. Accordingly, the mobile device 400 and/or the mobile application may be configured to connect automatically and simply display the account balance on the mobile device when the customer is within a specified range of the ATM, without displaying keypad 401. Additionally or alternatively, other customers might wish to use the remote control feature to make a deposit, in which case the numeric keypad 401 might be necessary.

In an embodiment of the invention, a customer may be able to generate a one-time use PIN authentication for another user (e.g., a family member or close friend who needs money). The customer could then use the mobile application to generate a one-time PIN which would then be sent to the mobile device of the second user. In embodiments of the invention, the second user could be identified by a mobile phone number, account number, other user identification number, or by any other identifier. Upon the generation of the PIN, the second user may then receive a notification that the PIN is ready for use. In an exemplary embodiment, the user would be required to use the PIN at a pre-specified ATM and/or within a pre-specified amount of time, for security purposes. The second user could then connect with the ATM using his or her mobile device as described herein. For example, in an exemplary embodiment, the user would use their mobile phone to scan a QR Code at the ATM. However, upon connecting to the ATM, the user would be required to enter or presented with the option to enter the customer-generated, one-time PIN in the place of and/or in addition to the user's own PIN. Those skilled in the art will appreciate that this embodiment may be desirable in instances where a user needs access to ATM services immediately but does not have access to adequate funds and/or a financial institution card.

Figure 5:
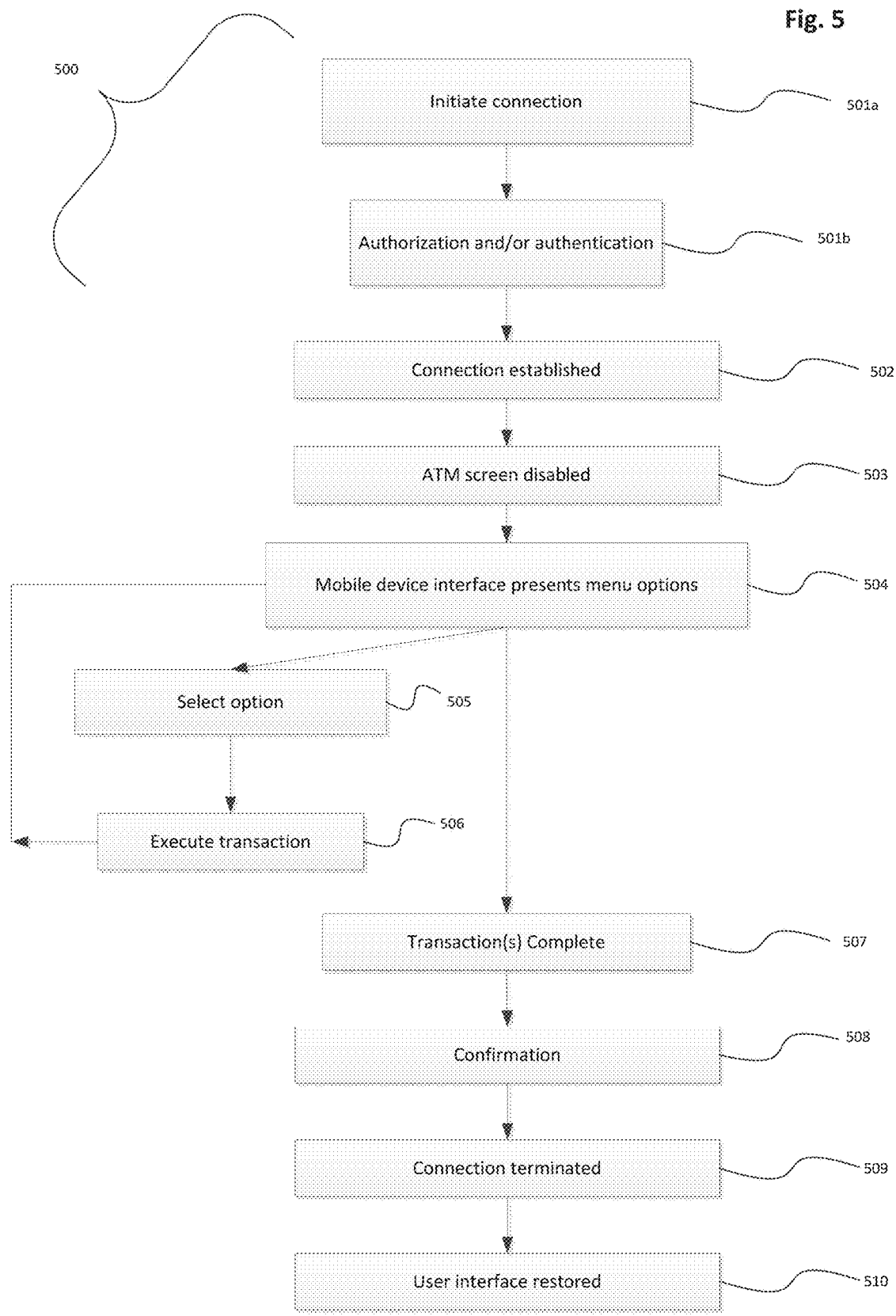
FIG. 5 is a flow diagram illustrating the operation of a method of the present invention, in accordance with an embodiment of the invention.

FIG. 5 is a flow diagram showing an exemplary transaction in an embodiment on the invention. A computer implemented method 500a for remotely connecting and controlling an ATM from a mobile device is illustrated in a flow diagram. A customer initiates the initial connection 501a by, for instance, scanning a QR code posted at the ATM with the customer's mobile device. The QR code accesses the mobile device browser over the network and may, for instance, direct the user to a web-based platform requiring authorization and/or authentication 501b by the user. For instance, in an embodiment of the invention, the customer may also be required to enter a security code (such as a PIN) and/or be required to answer a security question. In an embodiment of the invention, the mobile device itself will be capable of authenticating the connection. Once the connection has been established 502, the ATM screen will be immediately disabled 503. As described above, in embodiments of the invention, the screen may be blank and/or it may display targeted advertisements and/or display entertainment for children. Additionally or alternatively, other content may be generated as well. The customer may be presented with menu options 504 for the type of transaction to be executed by the customer on the mobile device. The customer may select an option 505 and use the mobile device to execute the transaction 506. The menu options 504 may then again be presented to the user, in the event that the customer is making two or more transactions of the same type (e.g., two separate deposits) and/or two or more transactions of differing types (e.g., one deposit, one withdrawal and one transfer). If the customer has completed their transaction(s) 507, the customer may then confirm that they wish to end the connection 508. Once confirmed, the connection is then terminated 509 and the typical mobile device user interface is restored 510.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 6:
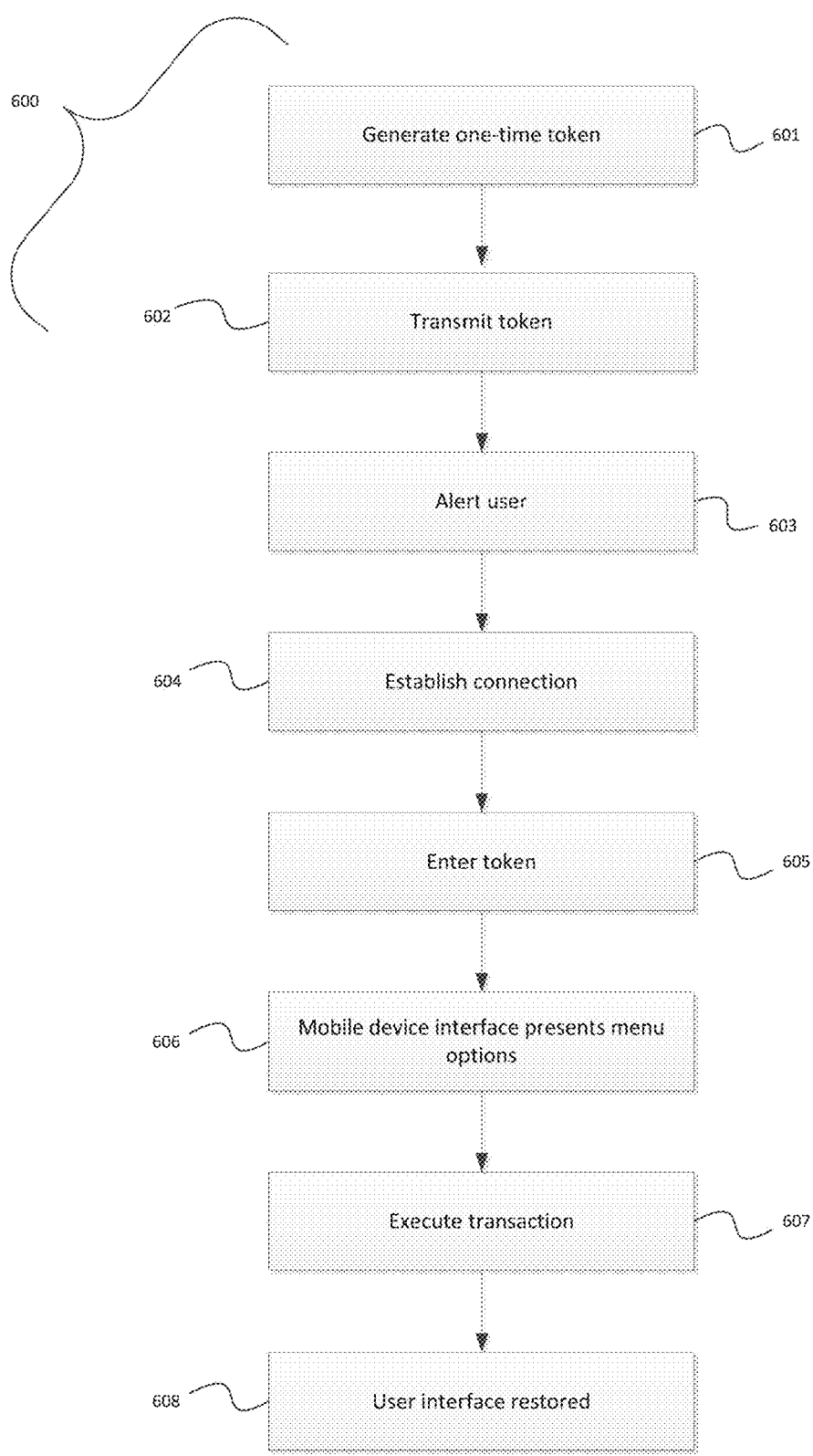
FIG. 6 is a flow diagram illustrating the operation of a method of the present invention, in accordance with an embodiment of the invention.

Turning now to FIG. 6, a flow diagram illustrates a computer implemented method 600 for generating and transmitting a one-time PIN for use by a second customer and remotely connecting to and controlling an ATM from a mobile device is illustrated in a flow diagram. The customer first generates the one-time token 601. In embodiments of the invention, this may be done on the mobile device or through a mobile application. The customer may also be presented with the option to set limitations on the use of the one-time token; for instance, after transmittal, the recipient must use the token at an ATM within 1 hour, or at a specific ATM location, or for a limited amount. In embodiments of the invention, no limits may be set on the use of the token. Those skilled in the art will also appreciate that a regular or recurring transaction (e.g., on the first of the month, every two weeks, etc.) may be automated so that the one-time token is automatically generated and sent to the recipient within the same parameters within the specified intervals.

The token is transmitted to the recipient 602. Those skilled in the art will appreciate that a one-time token may be transmitted to the recipient in any number of ways that are known in the art, e.g., e-mail, text message, through a mobile application, messenger system, and the like. Upon receipt, the recipient's mobile device will alert the recipient that the one-time token is ready for use 603. In embodiments of the invention, the notification to the recipient may also include important information about the limitations of the one-time code (for example, "Hello Recipient123. Your One-Time Code From Customer456 Is Ready For Use And Will Expire At 3:13 p.m. Today.").

The recipient, upon establishing a connection with an ATM 604 through his or her mobile device as described herein, will then be prompted to enter the token 605. In embodiments of the invention, for example, the recipient may open up a mobile application within a predefined distance of the ATM, in which case the application might ask for a PIN code and prompt the recipient to enter the one-time code. In other embodiments of the invention, further authentication may be required; for instance, the recipient may be required to transmit a picture of himself or herself using a camera associated with the mobile device. Additionally or alternatively, the customer may be required to authorize the transaction in real time via text message or through the use of a mobile application. Once the token has been entered 605 and the recipient's identity confirmed, the recipient may control the ATM from his or her mobile device as described herein and the user interface associated with the mobile device will present the recipient with menu options to complete a transaction. In embodiments of the invention where the customer has limited the parameters of the transaction (e.g., "withdrawal of $100.00 only"), the recipient may simply be presented with a prompt to this effect ("Please enter your desired withdrawal amount up to $100.00."). In other embodiments of the invention, the recipient may be authorized to complete other transactions, such as depositing a check directly to an account or making multiple withdrawals of unlimited amounts. The recipient then executes the authorized transaction(s) 607 and, upon termination of the connection, the user interface screen is restored 608.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A system for remotely accessing an automated teller machine ("ATM") associated with a financial institution, the system comprising:

an ATM keypad and an ATM screen associated with the ATM;

a mobile application operating on a mobile device, the mobile application displaying, on a mobile device display, responsive to detection by the mobile device, a selectable list of ATMs within a predetermined distance of the mobile device;

a transaction processing system, the transaction processing system being configured to: identify the mobile device over a network, the mobile device comprising an associated user input means and the mobile device display;

connect the mobile device to a selected ATM over the network, wherein the connection is authenticated using the mobile application;

display a remote keypad on the mobile device display associated with the mobile device;

wherein the remote keypad is operable to control the ATM keypad, and wherein a level of control afforded to the remote keypad on the mobile device to control the ATM keypad depends on a type of account maintained at the financial institution associated with the mobile device; and disabling ATM screen functionality upon connecting the mobile device to the selected ATM.

2. The system of claim 1, wherein the transaction processing system connects the mobile device to the ATM using a scannable barcode posted at the ATM.

3. The system of claim 2, wherein the scannable barcode is a Quick Response ("QR") Code.

4. The system of claim 1, wherein the transaction processing system connects the mobile device to the ATM using an alphanumeric code posted at the ATM to be manually entered into the mobile device via the user input means.

5. The system of claim 1, wherein the transaction processing system connects the mobile device to the ATM using the mobile application.

6. The system of claim 5, wherein the mobile application is associated with the financial institution.

7. The system of claim 5, wherein the mobile application launches automatically when the mobile device is within a predetermined distance of the ATM.

8. The system of claim 1, wherein the ATM screen is a touchscreen.

9. The system of claim 1, further comprising content generation components operable to display at least one of the following media content on the ATM screen while the mobile device is connected to the ATM over the network: an advertisement, a commercial, a game and/or a video clip.

10. The system of claim 9, wherein the content generation components are directed towards children.

11. A method for remotely accessing an automated teller machine ("ATM") associated with a financial institution, the ATM including an ATM keypad and an ATM screen, the method comprising:

providing a mobile application operating on a mobile device, the mobile application displaying, on a mobile device display, responsive to detection by the mobile device, a selectable list of ATMs within a predetermined distance of the mobile device;

utilizing a transaction processing system having a processor configured for:

identifying the mobile device over a network, the mobile device comprising an associated user input means and the mobile device display;

connecting the mobile device to a selected ATM over the network, wherein the connection is authenticated using the mobile application;

displaying a remote keypad on the mobile device display associated with the mobile device;

controlling the ATM keypad using the remote keypad, wherein a level of control afforded to the remote keypad on the mobile device to control the ATM keypad depends on a type of account maintained at the financial institution associated with the mobile device; and disabling ATM screen functionality upon connecting the mobile device to the selected ATM.

12. The method of claim 11, further comprising connecting the mobile device to the ATM using a scannable barcode posted at the ATM.

13. The method of claim 12, wherein the scannable barcode is a Quick Response ("QR") Code.

14. The method of claim 11, further comprising:

connecting the mobile device to the ATM using an alphanumeric code posted at the ATM; and manually entering the posted alphanumeric code into the mobile device via the user input means.

15. The method of claim 11, further comprising connecting the mobile device to the ATM using the mobile application.

16. The method of claim 15, wherein the mobile application is associated with the financial institution.

17. The method of claim 15, further comprising launching the mobile application automatically when the mobile device is within a predetermined distance of the ATM.

18. The method of claim 11, wherein the ATM screen is a touchscreen.

19. The method of claim 11, further comprising displaying at least one of the following media content on the ATM screen while the mobile device is connected to the ATM over the network: an advertisement, a commercial, a game and/or a video clip.

20. A method for remotely accessing an automated teller machine ("ATM") associated with a financial institution, the ATM including an ATM keypad and an ATM screen, the method comprising:

initializing, at a mobile device, a mobile application operable to cause the mobile device to perform the steps of:

detecting at least one ATM within a predetermined distance from a mobile device;

displaying a list of ATMs detected within a predetermined distance from the mobile device;

selecting at least one ATM;

connecting the mobile device to the selected ATM using the mobile application;

controlling the ATM keypad using a remote keypad associated with the mobile device, wherein a level of control afforded to the remote keypad on the mobile device to control the ATM keypad depends on a type of account maintained at the financial institution associated with the mobile device.

* * * * *